United States Patent [19]
Yoshimoto

[11] Patent Number: 6,148,299
[45] Date of Patent: *Nov. 14, 2000

[54] SELECTIVELY PROCESSING PLURALITY OF TRANSACTIONS USING TRANSACTION IDENTIFIERS THAT INCLUDING COMMITTING, ABORTING UPDATING AND CONTINUOUS UPDATING CONTENT IN A PLURALITY OF SHARED DATA

[75] Inventor: Masahiko Yoshimoto, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,712

[22] Filed: Jun. 12, 1997

[30] Foreign Application Priority Data

Jun. 14, 1996 [JP] Japan ................................. 8-154119

[51] Int. Cl.[7] ...................................................... G06F 17/30
[52] U.S. Cl. .............................. 707/8; 707/200; 707/202; 707/204; 714/13; 714/19; 714/20
[58] Field of Search ........................ 707/1–10, 100–104, 707/200, 201, 202, 203, 204, 205, 206; 395/726; 705/17, 19, 20–21, 30–31, 34–39, 42–43; 709/107, 200–203, 208–215, 231–232, 236–237; 714/11–20; 711/129–131, 161–162, 216

[56] References Cited

U.S. PATENT DOCUMENTS

| | | | |
|---|---|---|---|
| 5,440,743 | 8/1995 | Yokota et al. | 395/726 |
| 5,504,899 | 4/1996 | Raz | 707/10 |
| 5,682,537 | 10/1997 | Davies et al. | 395/726 |
| 5,689,706 | 11/1997 | Rao et al. | 707/201 |
| 5,721,915 | 2/1998 | Sockut et al. | 707/200 |
| 5,734,898 | 3/1998 | He | 707/203 |

FOREIGN PATENT DOCUMENTS

| | | | |
|---|---|---|---|
| 0457117A2 | 11/1991 | European Pat. Off. | 9/46 |
| 0578406A1 | 1/1994 | European Pat. Off. | 9/46 |
| 0674260A2 | 9/1995 | European Pat. Off. | 9/46 |

*Primary Examiner*—John Breene
*Assistant Examiner*—Srirama Channavajjala
*Attorney, Agent, or Firm*—Fitzpatrick, Cella, Harper & Scinto

[57] ABSTRACT

An information processing apparatus manages the correspondence between identification information, which is for identifying a plurality of transactions within one process, and the transactions. To this end, the information processing apparatus operates on the identification information by operations including creation, cancellation and switching of the identification information. The creation, cancellation and switching of the identification information then results in the corresponding operation on the respective transaction.

9 Claims, 8 Drawing Sheets

FIG. 9

| DIRECTORY INFORMATION |
|---|
| ⋮ |
| IDENTIFICATION INFORMATION MANAGEMENT MODULE |
| IDENTIFICATION INFORMATION OPERATION MODULE ( CREATION MODULE ) ( CANCELLATION MODULE ) ( SWITCHING MODULE ) |
| ⋮ |
| SWITCHING CONTROL MODULE |
| HANDLER ACTIVATION MODULE |
| SHARED EXCLUSIVE CONTROL MODULE |
| ⋮ |
| ⋮ |
| |
| |

SELECTIVELY PROCESSING PLURALITY OF TRANSACTIONS USING TRANSACTION IDENTIFIERS THAT INCLUDING COMMITTING, ABORTING UPDATING AND CONTINUOUS UPDATING CONTENT IN A PLURALITY OF SHARED DATA

BACKGROUND OF THE INVENTION

This invention relates to an information processing apparatus and method, particularly an information processing apparatus and method having a parallel control mechanism suited to an interactive cooperative-type application, by way of example.

Parallel control in transaction processing is carried out in accordance with a two-phase lock. This control is employed widely as means for separating a plurality of transactions and assuring coherent scheduling. Furthermore, in order to assure coherence even in recovery processing at the time of failure, it is common for lock release processing in a two-phase lock to be executed attendant upon commit processing following the transaction.

However, problems are encountered in the art described above.

Specifically, recent computer systems generally provide an interactive operating environment using a multiple-window system. A desirable application in a multiple-window system is one which updates data interactively while presenting a versatile display of data shared using a database.

In the art described above, however, a problem arises in a case where a certain application applies updating processing to a plurality of shared data. The problem is that while update content regarding certain shared data is being committed, an operation through which updating processing continues to be applied to other shared data or through which update content is canceled is inhibited. This imposes a major restriction upon the realization of an interactive operating environment with regard to shared data having a complicated structure.

The effective canceling of update content with regard to some shared data while the update content regarding some shared data is being committed is not necessarily impossible using the art described above.

For example, in a transaction, the content of data is saved before data update processing is started, and processing for invalidating the update content is executed based upon the content saved, thereby making it possible to cancel the update content effectively when the transaction is completed. With this method, however, it is required to save the content of all shared data that is the object of data updating. This means that a decline in efficiency is unavoidable. Further, in a database management system, there are occasions where updating of a time stamp relating to a commitment or activation of a daemon procedure is carried out. Since these are unrelated to the effective canceling of update content, they can be undesirable side-effects in certain circumstances.

Further, though continuing the updating processing of some shared data while update content regarding other shared data is being committed can be said to be impose a severe restriction, it also is not necessarily impossible.

For example, in a computer system in which multitasking is possible, the above-mentioned restriction is not imposed upon a series of transactions activated independently task by task, and therefore it is possible to execute selective commit processing over a wide range which includes the realization of an interactive operating environment with regard to shared data having a complicated structure. With this method, however, the load upon the operating system or the database management system generally increases as the number of tasks increases, and greater labor is required for application development.

Furthermore, since a method utilizing multitasking processing divides an application, which originally runs as a whole, into a plurality of tasks, it is required that tasks be linked by communication means between the tasks. Since inter-task communication means generally is independent of a transaction, the application developer must exclude the possibility that the coherence of the transaction will be lost by communication dependent upon the content of shared data. However, this is extremely difficult and results in applications that are greatly wanting in terms of extendibility and maintenance.

SUMMARY OF THE INVENTION

An object of the present invention is to provide an information processing apparatus and method in which, when a certain application applies updating processing to a plurality of shared data, it is possible to perform an operation in which, while update content regarding certain shared data is being committed, updating processing continues to be applied to other shared data or the update content is canceled.

According to the present invention, the foregoing object is attained by providing an information processing apparatus comprising management means for managing correspondence between identification information, which is for identifying a plurality of transactions within a process, and the transactions, and operating means for operating the identification information.

According to the present invention, the foregoing object is attained by providing an information processing method comprising a management step of managing correspondence between identification information, which is for identifying a plurality of transactions within a process, and the transactions, and an operating step of operating the identification information.

In accordance with the present invention having the construction described above, it is possible to provide an information processing apparatus and method in which, when a certain application applies updating processing to a plurality of shared data, it is possible to perform an operation in which, while update content regarding certain shared data is being committed, updating processing continues to be applied to other shared data or the update content is discarded.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 illustrates an example of the memory map of a storage medium storing program codes according to the present invention.

DESCRIPTION OF THE PREFERRED EMBODIMENTS

Figure 8:
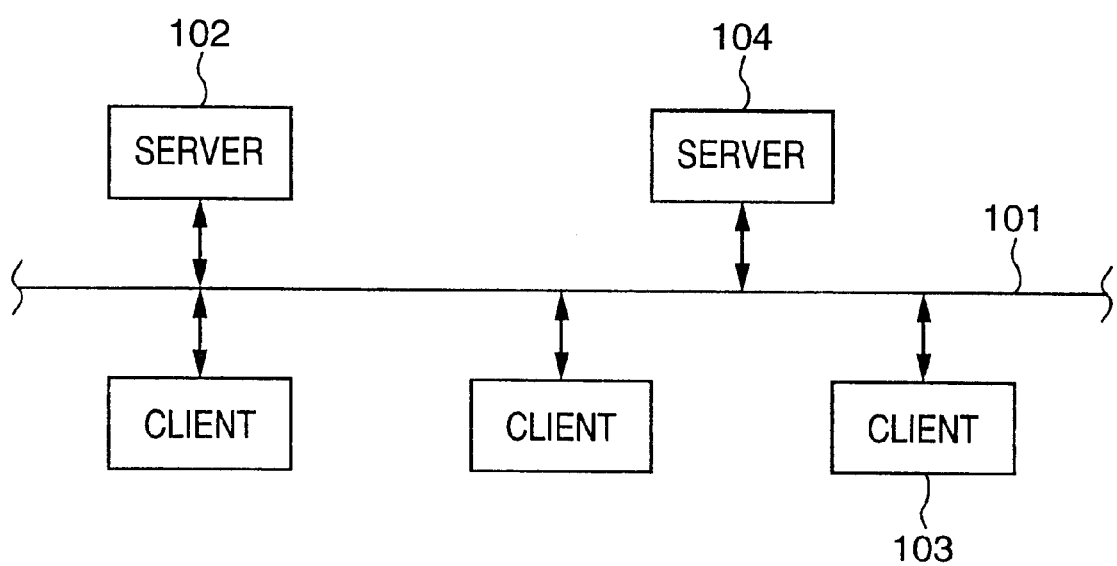
FIG. 8 is a diagram for describing an example of a computer system for practicing the present invention.

An system for practicing the present invention is a computer system, of the kind exemplified in FIG. 8, in which computers such as work stations or personal computers are interconnected by any network 101. A database server, for example, operates as software at servers 102, 104 of the computer system to provide a data sharing mechanism between applications based upon a transaction. An application which operates at a client 103 and utilize s the data sharing mechanism executes processing while communicating with a database management server by a prescribed library.

A series of procedures described below are implemented by the database management server, although some or all of the procedures may be implemented by the above-mentioned library. Further, the database management server may be constituted by a plurality of servers. The present invention has no relation to the construction or role sharing of the database management server and library and therefore is referred to simply as a database management system in the description that follows.

First Embodiment

First, transaction context is introduced anew as a mechanism for identifying a plurality of transactions within an application process.

Transaction context is a state expressed by the type of record in well-known procedural programming language. The content expressed includes information such as the identifier of a transaction activated under the transaction context, a flag (switching inhibit flag) which designates inhibition of transaction context switching, and a handler activated when a transaction is aborted for external reasons. Here a transaction belongs to the transaction context that prevails at the time the transaction is activated, and the transaction context is not changed until the transaction is finished. Such a state is expressed as follows: "The transaction is activated under the transaction context."

A transaction activated under transaction context is at most one transaction serving as a top-level transaction on the outermost side of a nested structure. When the transaction has not been activated, the expression used is "The transaction context is empty." Identifiers based upon numerals or character strings are given in the transaction context, and a transaction context management table is provided as a correspondence table constructed by well-known means, whereby identifiers and transaction contexts are made to uniquely correspond. The above-mentioned identifiers are designated as parameters in transaction context operations.

Figure 1:
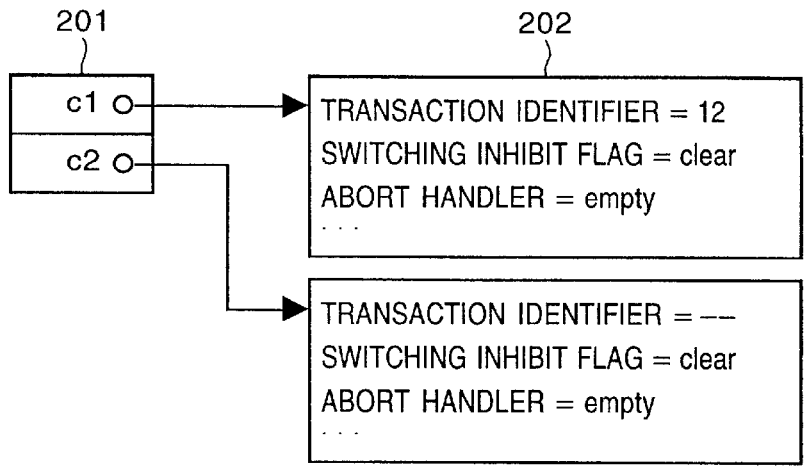
FIG. 1 is a diagram illustrating a transaction context management table and transaction context in a database management system.

FIG. 1 is a diagram illustrating a transaction context management table and transaction context in a database management system.

Shown in FIG. 1 are a transaction context management table 201 and transaction context 202. Two transaction contexts 202 are provided in correspondence with identifiers c1 and c2 of the management table 201. In the transaction context that corresponds to the identifier c1, a transaction that corresponds to "transaction identifier=12" is activated. The transaction context corresponding to the identifier c2 is empty.

Creation of Transaction Context

Figure 2:
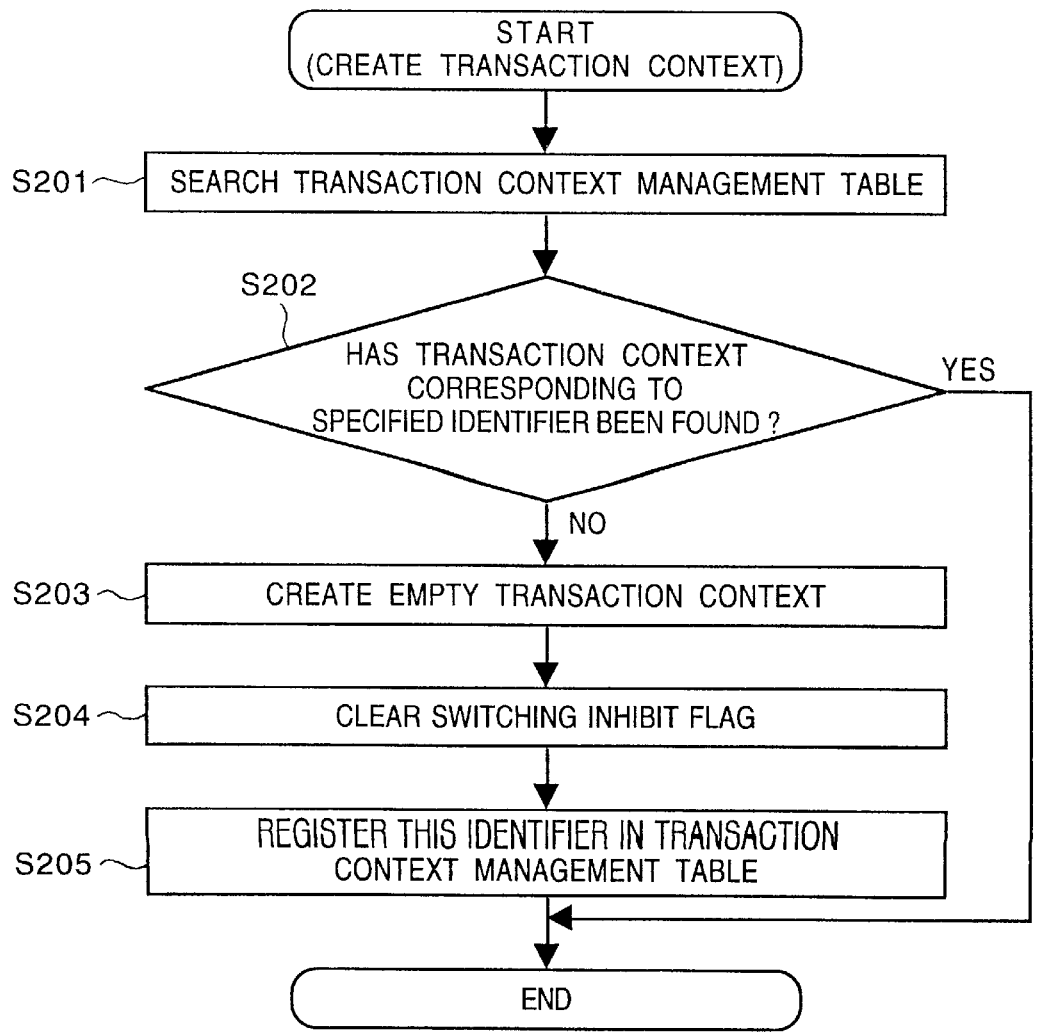
FIG. 2 is a flowchart illustrating an example of a procedure for creating transaction context.

FIG. 2 is a flowchart illustrating an example of a procedure for creating transaction context.

The transaction context management table is searched at step S201 in FIG. 2 in order to determine whether a transaction context corresponding to a specified identifier exists. Next, at step S202, the results of the search are judged and processing is ended if a transaction context corresponding to the specified identifier is found.

If a transaction context corresponding to the specified identifier is not found at step S202, then the program proceeds to step S203 in order to create and register a transaction context anew. More specifically, a transaction context is created at step S203, after which the switching inhibit flag is cleared at step S204. This is followed by step S205, at which the identifier of the newly created transaction context is registered in the transaction context management table. Processing is then terminated.

From the viewpoint of convenience in application development, it is desirable that a utilizable transaction context exist without expressly executing the procedure of FIG. 2. For example, an application based upon the prior art is equivalent to an instance where transaction context is limited to one in number in the present invention. In other words, a transaction context in a case where there is a limitation may be created immediately at least before activation of the transaction and may exist only during execution of the transaction.

However, even in a case where a plurality of transaction contexts described below are used, circumstances in which a transaction context does not exist temporarily can arise. In this embodiment, a default transaction context is provided as means commonly applicable to such circumstances. More specifically, in a case where a transaction context is not expressly specified, the present embodiment is such that an operation which an application performs with regard to a database is handled as an operation relating to a transaction that belongs to the default transaction context. It should be noted that a prescribed identifier such as the numeral "0" or a empty character string is assigned to the default transaction context and that the operation of any transaction context is possible by means of this identifier.

Switching of Transaction Context

Figure 3:
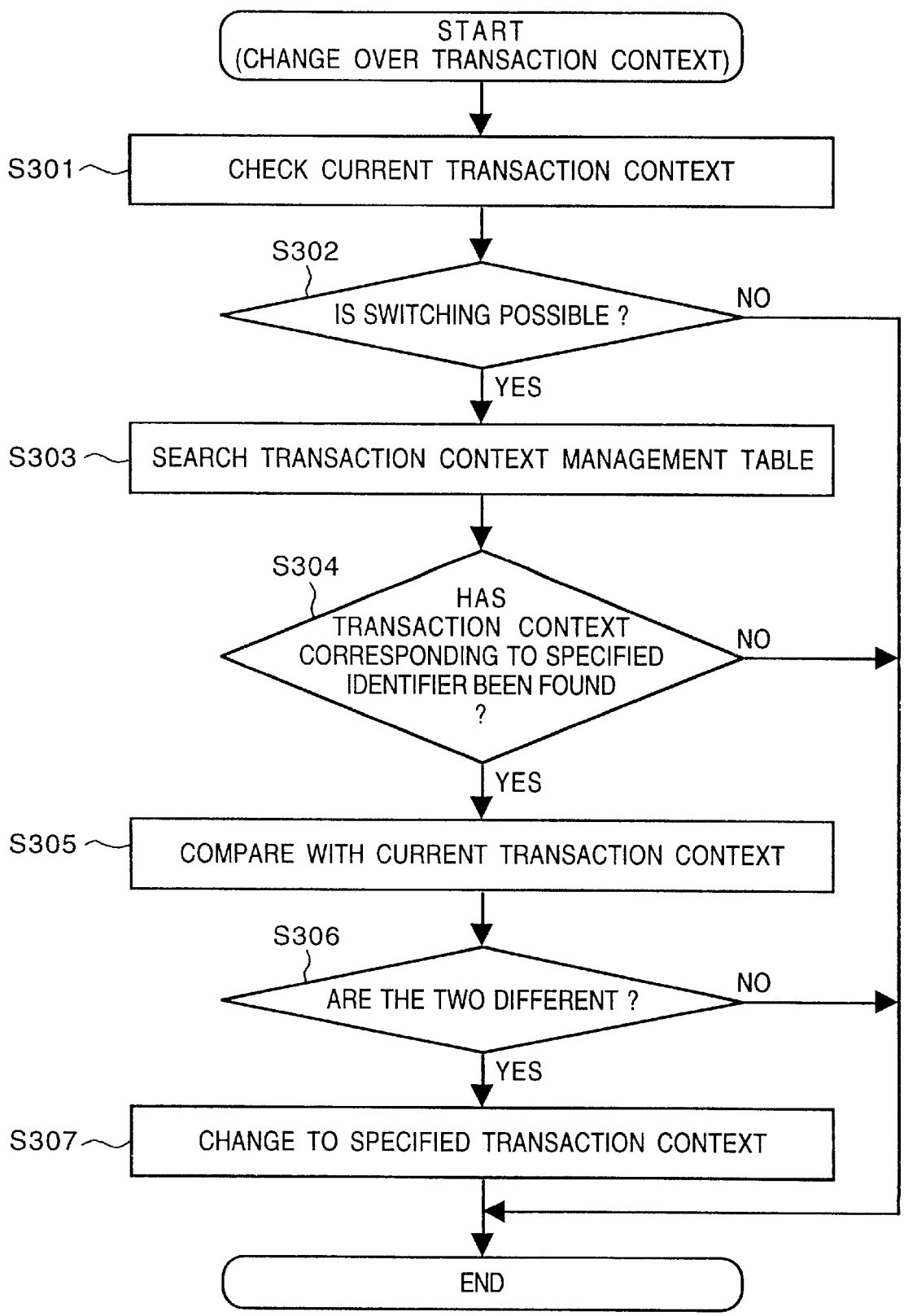
FIG. 3 is a flowchart illustrating an example of a procedure for changing over transaction context.

FIG. 3 is a flowchart illustrating an example of a procedure for changing over transaction context.

Whether or not the current transaction context is capable of being changed over is checked at step S301. The fact that switching is possible means that the switching inhibit flag in the current transaction context has been cleared. The results of the check are judged at step S302. If the switching inhibit flag has not been cleared, processing is terminated.

If the switching inhibit flag has been cleared and switching is possible, on the other hand, the program proceeds to step S303, where the transaction context management table is searched in order to determine whether a transaction context corresponding to a specified identifier exists. Next, at step S304, the results of the search are judged and processing is ended if a transaction context corresponding to the specified identifier is not found.

If a transaction context corresponding to the specified identifier is found at step S304, on the other hand, the retrieved transaction context and the current transaction context are compared at step S305. The result of the comparison is judged at step S306. If the retrieved transaction context and the current transaction context are found to be different at step S306, then the transaction context is changed to the specified transaction context at step S307.

In the case where the transaction context has been changed, all operations regarding the transaction or shared data are carried out with regard to the transaction belonging to the specified transaction context by the time the next switching operation is performed.

Erasure of Transaction Context

Figure 4:
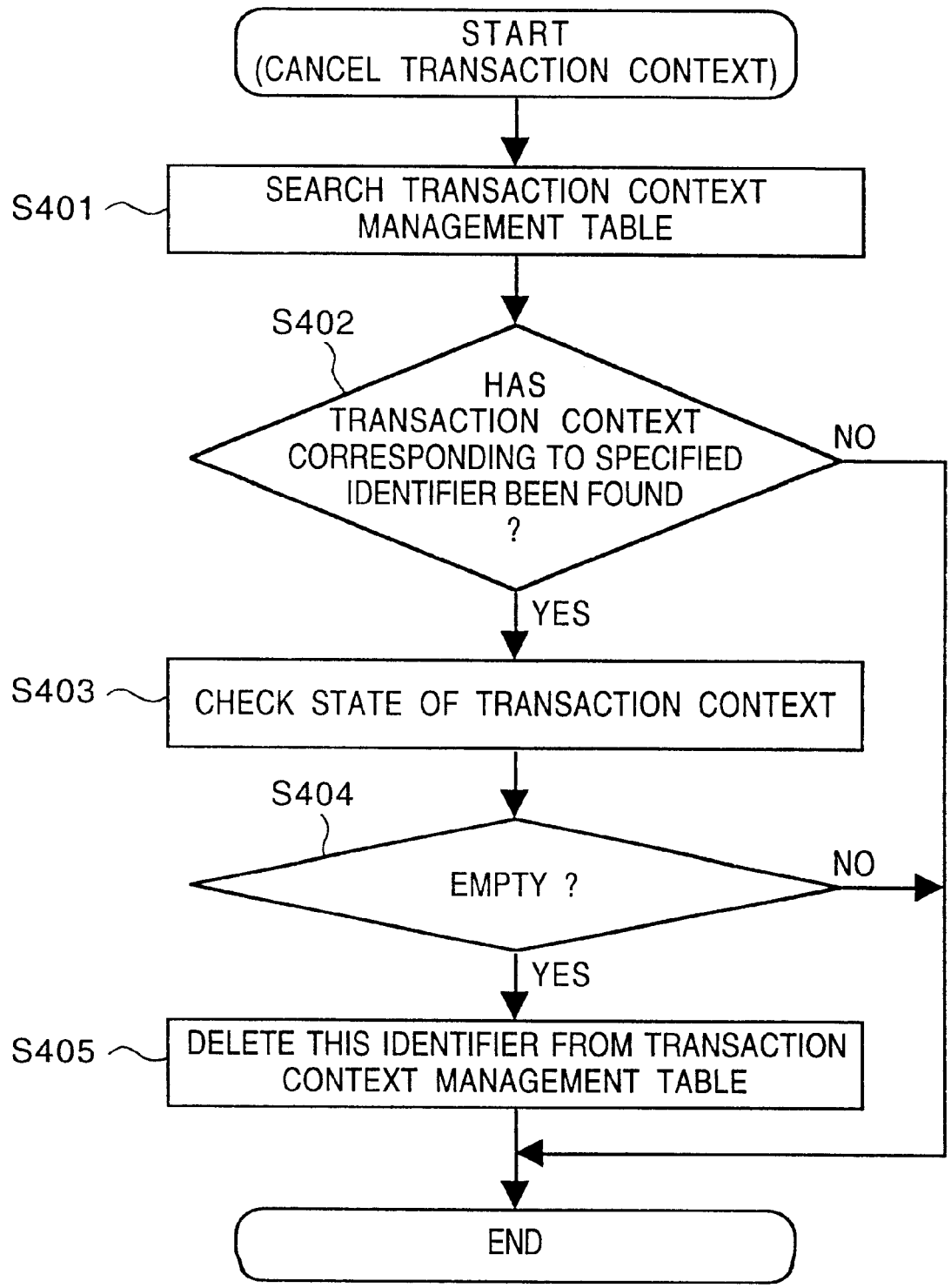
FIG. 4 is a flowchart illustrating an example of a procedure for erasing specified transaction context.

FIG. 4 is a flowchart illustrating an example of a procedure for erasing specified transaction context.

The transaction context management table is searched at step S401 in FIG. 4 in order to determine whether a transaction context corresponding to a specified identifier exists. Next, at step S402, the results of the search are judged and processing is ended if a transaction context corresponding to the specified identifier is not found.

If a transaction context corresponding to the specified identifier is found at step S402, then the state of the found transaction context is examined at step S403. Next, at step S404, the results of the search are judged and processing is ended if a transaction context corresponding to the specified identifier is not empty.

If the transaction context corresponding to the specified identifier is empty, however, then the specified identifier is deleted from the transaction context management table at step S405. If necessary, a record expressing the transaction context is released before terminating processing.

In the case where the current transaction context is erased, processing for making the change to the default transaction context is executed as necessary. However, this does not impose a limitation. For example, a procedure which inhibits cancellation of the current transaction context may be added to the procedure of FIG. 4.

Selective Commit Processing

Selective commit processing implemented using the foregoing procedures will be described in detail.

In an application using shared data A, B and C, three transaction contexts corresponding to three identifiers a, b and c are created through the procedure of FIG. 2 and the transaction context regarding the identifier a, the transaction context regarding the identifier b and the transaction context regarding the identifier c are made to correspond to the shared data A, B and C, respectively. The fact that the shared data A and the transaction context regarding the identifier correspond means that the identifier for the transaction context is changed to the identifier a in accordance with the procedure of FIG. 3, the transaction belonging to the identifier a is activated, and updating processing regarding the shared data A is executed in the transaction. An exclusive lock relating to the shared data A, B and C is assured in the transactions belonging to the identifiers a, b and c.

Selective commit processing, which is difficult to carry out in the prior art, namely processing for committing the content of the change of the shared data A, aborting the update content of the shared data B and continuing the updating processing of the shared data C, is possible. More specifically, it will suffice to change the identifier regarding the transaction context to the identifier a, commit the transaction, then make a change to the identifier b and abort. Since the individual transactions do not contravene the two-phase lock agreement in the above-mentioned processing, loss of coherence is avoided as well.

Assuring Coherence

Assurance of coherence will now be described in detail.

A transaction context is a state peculiar to a process and has no influence upon another process. That is, a series of transactions moved by another process are equal without relation to the constitution of the transaction context. For this reason, cases in which problems can arise in terms of coherence are limited to those in which a plurality of transactions belonging to a certain process overlap one another. Such a condition apparently seems to be in contravention of the premise of transaction processing, namely the mutual separability of transactions.

In actuality, the two-phase lock system has been proposed as a condition for making it possible to serialize a series of mutually separated transactions. This, however, does not apply to a case where the execution of a transaction is controlled by one and the same process. The two-phase lock system is originally premised on the fact that arbitrariness in transaction scheduling, namely the order of transactions which operate in parallel, generally is unpredictable. By contrast, with regard to a plurality of transactions that have been activated in one process, it is possible for the order of processing to be decided freely and it is not necessary to consider the possibility of serialization with regard to indeterminate scheduling. In other words, it is sufficient if the possibility of serialization is assured between transactions that have been activated in different processes. In the present invention, this condition is clearly satisfied.

Revision of Lock Management Mechanism

It is required that the revision illustrated below be applied to the lock management mechanism in a database management system.

In the example described above, transaction contexts corresponding to respective ones of three items of shared data are provided. However, it is more convenient in terms of creating an application if it is possible to refer to shared data corresponding to different transaction contexts, e.g. to shared data B or C in the transaction context belonging to the identifier a. This is nothing other than overlapping of a plurality of transactions belonging to the above-mentioned process. In this case, in the relationship with a transaction exterior to the process, it will suffice if a shared lock with respect to the shared data B or C is assured in the transaction context that belongs to the identifier a in order to assure the possibility of serialization. In other words, an exclusive lock and a shared lock apparently coexist among a plurality of transactions within a process.

Assuring a shared lock which coexists with an exclusive lock is similar to a case in which an ordinary shared lock is assured, and it will suffice to carry this out before making reference to the shared data. The same holds with regard to assuring an exclusive lock which coexists with a shared lock. Further, in a transaction external to a process, the coexistence of an exclusive lock and a shared lock is meaningless and it will suffice if only the exclusive lock is known. It is satisfactory if the existence of the shared lock becomes clear at the moment the exclusive lock is released. This is ideal in terms of achieving agreement with conventional semantics.

On the other hand, while it is possible to allow a plurality of transactions in a process to acquire an exclusive lock simultaneously, the present invention basically does not permit this for the reasons set forth below.

First, as seen from a transaction external to a process, the existence of a plurality of exclusive locks is clearly undesirable. However, since a series of exclusive locks are equivalent, it is difficult to establish correspondence with conventional semantics. Further, the revision of a database management system is much more difficult in comparison with a case regarding a shared lock. In addition, even in a case where this revision is not allowed, the object is substantially attained if a switching is made to another transaction context temporarily using the procedure shown in FIG. 3. Moreover, expressly stating the switching in the application is also advantageous in terms of improving maintenance.

In view of the foregoing, an exclusive lock acquired within a process is made at most one with regard to shared data, and a case in which the acquisition of a plurality of exclusive locks are requested results in processing ending in an abnormality.

Second Embodiment

An information processing apparatus according to a second embodiment of the invention will now be described. Elements in the second embodiment substantially the same as those of the first embodiment are designated by like reference characters and need not be described in detail again.

The first embodiment described above is applicable also to an application using multiple-window environment.

For instance, in the example described above, three windows Wa, Wb and Wc are provided, and a transaction context belonging to identifier a, a transaction context belonging to identifier b and a transaction context belonging to identifier c are made to correspond to the windows Wa, Wb and Wc, respectively. In a case where each transaction context is changed over, the switching of the transaction context may be performed by selecting the window. In such case, however, the following problem arises:

When acquisition of locking with regard to shared data is requested in a transaction, the transaction enters a waiting state if the request is not satisfied immediately. In an interactive application, on the other hand, it is possible for application-specific processing to be executed even while the transaction is in the waiting state. Consequently, in a case where use is made of a transaction context, there is a possibility that the transaction context will be changed while the transaction is in the waiting state.

In a case where the transaction context has been changed, it is necessary to return to the original transaction context in order to resume processing at the moment the waiting state is canceled. However, this is not always easy to do. Since the cancellation of the waiting state occurs asynchronously with respect to the application, consideration is given to means (such as a software interrupt) for resuming processing asynchronously. However, in many programming languages, a description of asynchronous processing is more complicated than a description of synchronous processing and is not practical for transactions in which read/write is performed with regard to a large number of items of shared data.

Inhibiting Switching of Transaction Context

Figure 5:
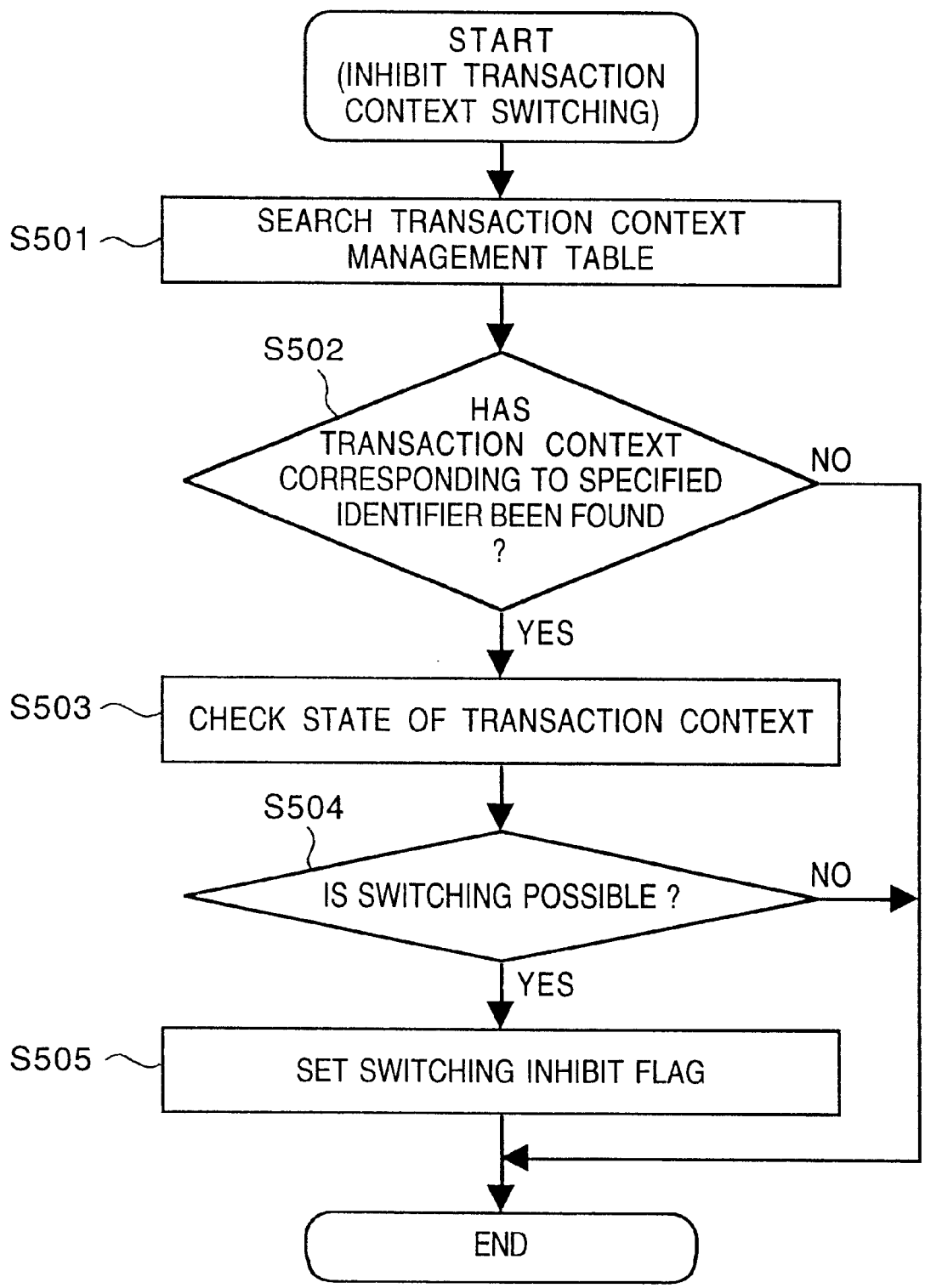
FIG. 5 is a flowchart illustrating an example of a procedure for inhibiting switching of transaction context.

Switching of transaction context is inhibited by the procedure shown in FIG. 5 in order to solve the foregoing problem.

The transaction context management table is searched at step S501 in FIG. 5 in order to determine whether a transaction context corresponding to a specified identifier exists. Next, at step S502, the results of the search are judged and processing is ended if a transaction context corresponding to the specified identifier is not found.

If a transaction context corresponding to the specified identifier is found at step S502, then the state of the found transaction context is examined at step S503 to determine whether the transaction context that has been found is capable of being changed over. Next, at step S504, the results of the search are judged and processing is ended if the switching inhibit flag has not been cleared.

If the switching inhibit flag has been cleared, however, then the switching inhibit flag of the transaction context of a specified identifier is set at step S505 and processing is terminated.

The above-described procedure can be modified in such a manner that designation of the identifier is allowed to be omitted and the foregoing processing is execute with regard to the current transaction context.

Canceling Inhibition of Transaction-Context Switching

Figure 6:
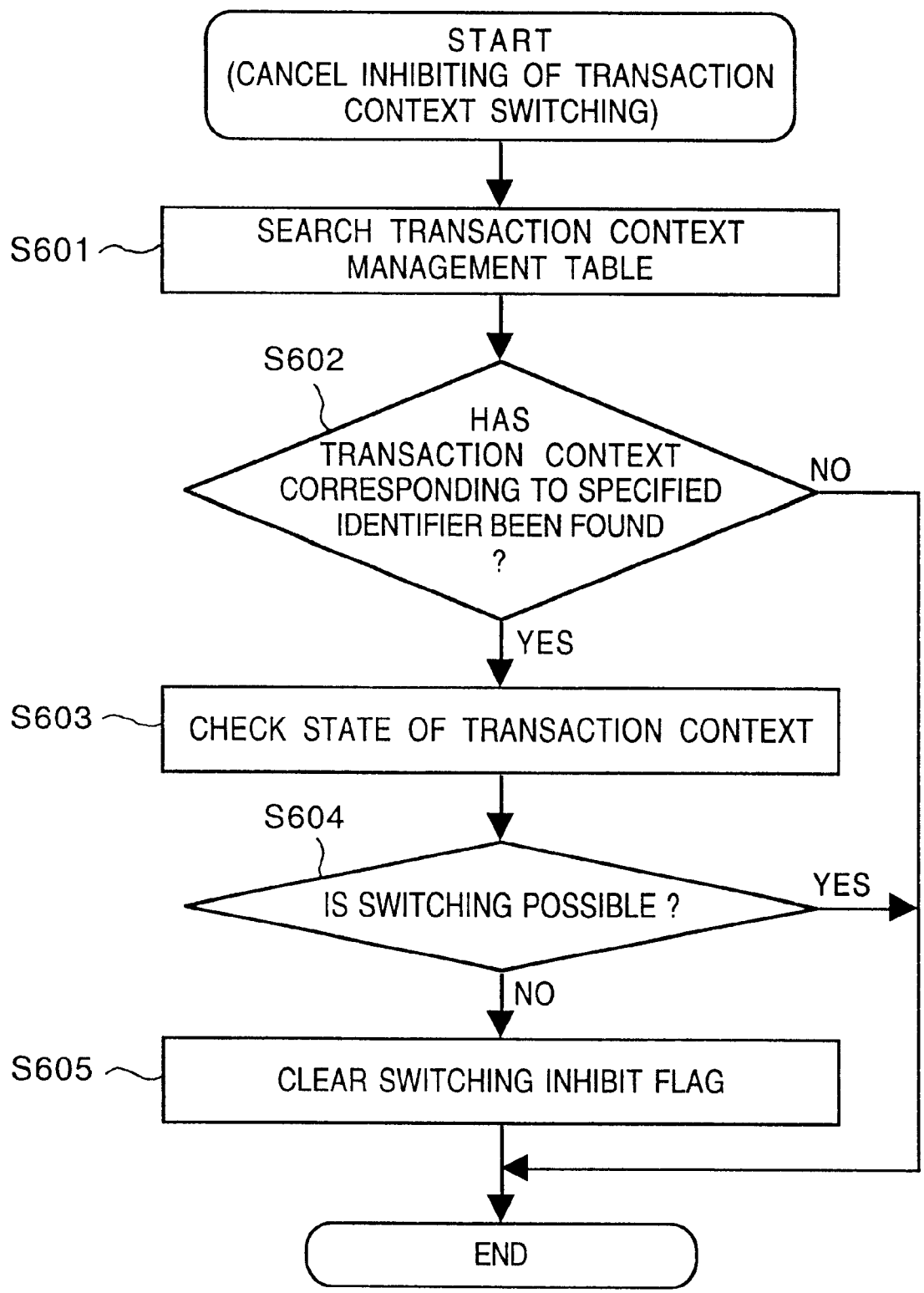
FIG. 6 is a flowchart illustrating an example of a procedure for canceling the inhibition on switching of transaction context.

FIG. 6 is a flowchart illustrating an example of a procedure for canceling the inhibition on switching of transaction context.

The transaction context management table is searched at step S601 in FIG. 6 in order to determine whether a transaction context corresponding to a specified identifier exists. Next, at step S602, the results of the search are judged and processing is ended if a transaction context corresponding to the specified identifier is not found.

If a transaction context corresponding to the specified identifier is found at step S602, then the state of the found transaction context is examined at step S603 to determine whether the transaction context that has been found is capable of being changed over. Next, at step S604, the results of the search are judged and processing is ended if the switching inhibit flag has been cleared.

If the switching inhibit flag has been set, then the switching inhibit flag of the transaction context of a specified identifier is cleared at step S605 and processing is terminated.

The above-described procedure can be modified in such a manner that designation of the identifier is allowed to be omitted and the foregoing processing is execute with regard to the current transaction context.

In accordance with the procedures described above, the transaction-context switching inhibit flag is capable of being changed to the set or cleared state. On the other hand, in accordance with the transaction-context switching means shown in FIG. 3, the state of the switching inhibit flag is examined at step S301. It is possible, therefore, to inhibit switching of transaction context and cancel the inhibition at will.

Third Embodiment

An information processing apparatus according to a third embodiment of the invention will now be described. Elements in the third embodiment substantially the same as those of the first embodiment are designated by like reference characters and need not be described in detail again.

There are occasions where a transaction is aborted externally owing to hardware failure or deadlock. In a case where external abort occurs asynchronously and exception processing specific to an application is executed, the usual practice is to set an exception handler in advance.

On the other hand, in a case where transaction context in the present invention is used, it is more advantageous for this exception processing to be executed in a transaction context corresponding to a transaction. The reason is that the purpose of exception processing is to execute application-specific post-processing in response to abnormal end of a transaction, and this application-specific post-processing clearly is peculiar to the transaction context.

In order to meet the above-mentioned requirement, the setting of the exception handler is performed for every transaction context in this embodiment. That is, means for setting "handler is activated when transaction is aborted for external reasons" in the content expressed by transaction context described in the first embodiment is provided. This setting means is specific to the programming language used.

Figure 7:
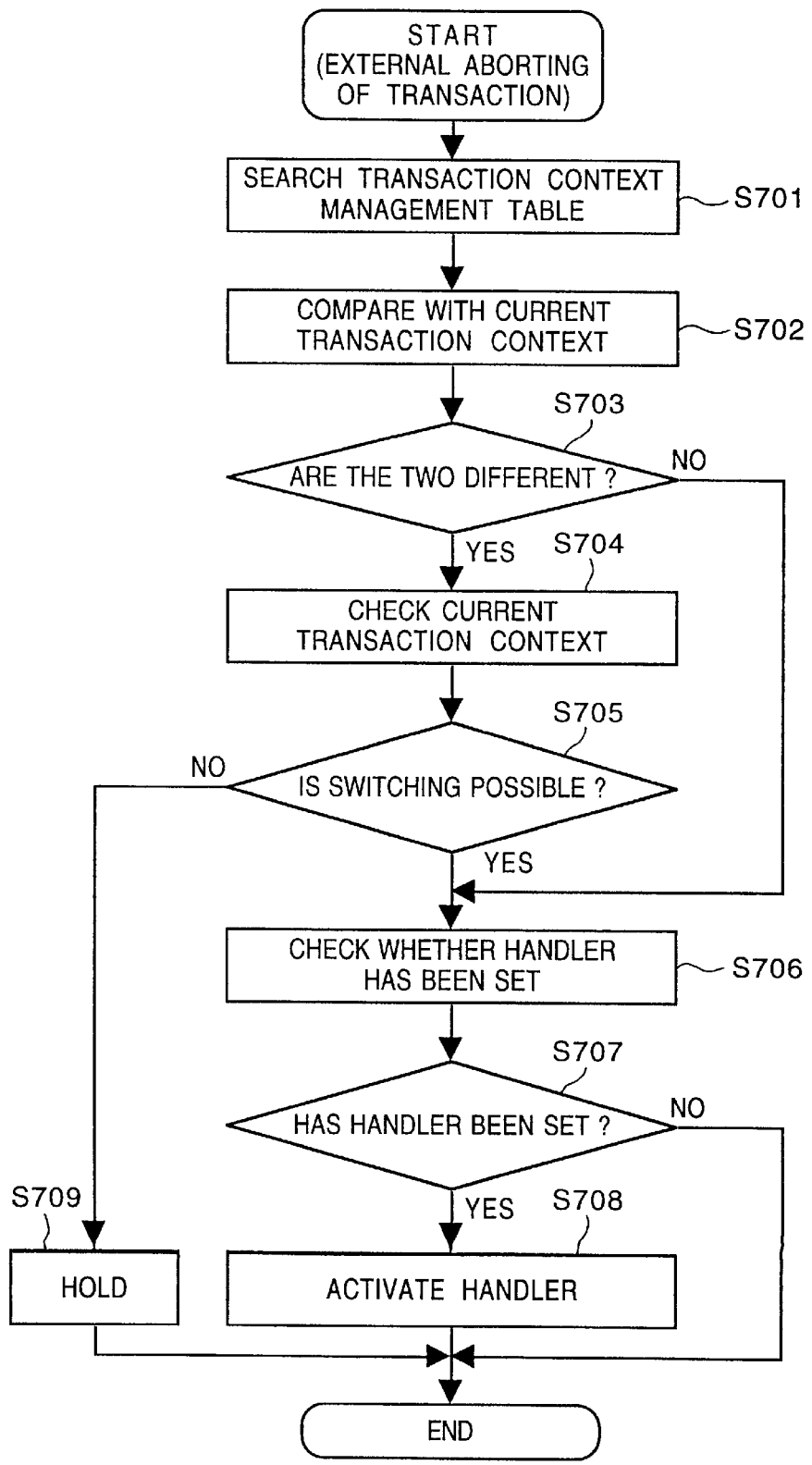
FIG. 7 is a flowchart illustrating an example of a procedure for activating a handler in an external transaction abort.

FIG. 7 is a flowchart illustrating an example of a procedure for activating a handler in an external transaction abort.

A transaction context corresponding to an aborted transaction is retrieved by the transaction context management table at step S701 in FIG. 7. Next, at step S702, the retrieved transaction context and the current transaction context are compared. The result of the comparison is judged at step S703 and the program proceeds to step S706 if the two are identical. If the two are different, the current transaction context is searched at step S704. The results of the search are judged at step S705 and the program proceeds to step S706 if switching is possible. If switching is not possible, hold processing is executed at step S709 and then processing is terminated.

Next, whether or not the handler has been set is checked at step S706. The result is judged at step S707 and processing is terminated if the handler has not been set. If the handler has been set, on the other hand, then the handler that has been set is activated at step S708.

The details of step S708 will now be described. First, the transaction context is changed over in accordance with the procedure shown in FIG. 3 and switching of the transaction context is inhibited in accordance with the procedure shown in FIG. 5. The handler is then activated. In the meantime the means for canceling the inhibition of transaction-context switching shown in FIG. 6 is rendered inoperative. Finally, at the moment execution of the handler ends, the inhibition of transaction-context switching is canceled by the procedure shown in FIG. 6, the transaction context that prevailed prior to the abort processing is set again by the procedure shown in FIG. 2 and then processing is ended.

The hold processing of step S709 is as follows: If switching of transaction context has been inhibited, then, rather than activating a handler, the handler that has been set is activated at the moment the inhibition of switching of the current transaction context is canceled, namely at the moment the database management system executes the procedure of FIG. 5 for canceling the switching inhibition. This is one type of delay evaluation means. Accordingly, in a case where abort of a plurality of transactions has occurred, there are instances where a plurality of handlers are activated, in which case the activation sequence of the handlers conforms to the external abort sequence.

It should be noted that the procedure illustrated in FIG. 7 deals with the external aborting of a transaction. However, there are instances where executing post-processing by one and the same handler is more advantageous in the creation of an application. In such case, and by way of example, a handler activation flag corresponding to an internal transaction abort is added onto a transaction context and means for changing the handler activation flag is provided, whereby a change can be made in such a manner that the handler is activated with respect to internal aborting of a transaction.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiments to a system or an apparatus, reading the program codes with a computer (e.g., a CPU or MPU) of the system or apparatus from the storage medium, and then executing the program. In this case, the program codes read from the storage medium implement the functions according to the embodiments, and the storage medium storing the program codes constitutes the invention. Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system (OS) or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

In a case where the present invention is applied to the above-mentioned storage medium, program codes corresponding to the flowchart described earlier are stored on this storage medium. More specifically, modules illustrated in the example of the memory map of FIG. 9 are stored on the storage medium.

Specifically, it will suffice to store program codes of at least modules of "identification information management" and "identification information operation" on the storage medium. Furthermore, it is preferred that program codes of modules of "identification information switching control", "handler activation" and "shared exclusive control" be stored on the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:

a management circuit adapted to manage correspondence between a transaction context corresponding to shared data and a plurality of transactions using an identifier, wherein the transaction context identifies a plurality of transactions within one process; and an operating circuit adapted to selectively operate on the transaction context by using operations including committing a content of a change of a first shared data, aborting updating a content of a second shared data, and continuing updating processing of a third shared data.

2. The apparatus according to claim 1, wherein said management circuit manages a default transaction context that is utilized without using said operating circuit.

3. The apparatus according to claim 1, further comprising an activation circuit adapted to, when a transaction is aborted, activate a handler that has been set in a transaction context corresponding to the transaction.

4. The apparatus according to claim 1, further comprising a shared exclusive control circuit adapted to simultaneously assure a shared lock and an exclusive lock, with respect to one lock object, in a plurality of transactions within one process.

5. The apparatus according to claim 4, wherein said shared exclusive control circuit assures the exclusive lock only in one transaction irrespective of whether it is a transaction included in the one process.

6. An information processing method comprising:

a management step of managing correspondence between a transaction context corresponding to shared data and a plurality of transactions using an identifier, wherein the transaction context identifies a plurality of transactions within one process; and an operating step of selectively operating on the transaction context by using operations including committing a content of a change of a first shared data, aborting updating a content of a second shared data, and continuing updating processing of a third shared data.

7. The method according to claim 6, further comprising an activating step of activating, when a transaction is aborted, a handler that has been set in a transaction context corresponding to the transaction.

8. The method according to claim 6, further comprising a shared exclusive control step of simultaneously assuring a shared lock and an exclusive lock, with respect to one lock object, in a plurality of transactions within one process.

9. A computer-readable memory medium storing program codes of an information processing method, the program codes comprising:

a program code of a management step of managing correspondence between a transaction context corresponding to shared data and a plurality of transactions using an identifier, wherein the transaction context identifies a plurality of transactions within a process; and a program code of an operating step of selectively operating on the transaction context by using operations including
committing a content of a change of a first shared data, aborting updating a content of a second shared data, and continuing updating processing of a third shared data.

* * * * *